United States Patent [19]

Rios-Rivera et al.

[11] Patent Number: 5,274,498
[45] Date of Patent: Dec. 28, 1993

[54] OPTICAL SYSTEM FOR A NIGHT VISION VIDEO CAMERA

[75] Inventors: Arturo R. Rios-Rivera, Arecibo, P.R.; Michael Palermiti, Jupiter, Fla.

[73] Assignee: Pactylamatic, Inc., Arecibo, P.R.

[21] Appl. No.: 868,172

[22] Filed: Apr. 14, 1992

[51] Int. Cl.$^5$ ............................................. G02B 17/00
[52] U.S. Cl. .................................. 359/365; 359/727; 359/730; 359/858
[58] Field of Search ...................... 359/726–727, 359/731–732, 850, 363–366, 728–730, 857–859; 354/201, 220, 224–225

[56] References Cited

U.S. PATENT DOCUMENTS

| | | | |
|---|---|---|---|
| 2,683,393 | 7/1954 | Drew | 359/728 |
| 2,817,270 | 12/1957 | Mandler | 359/728 |
| 3,443,853 | 5/1969 | Todd | 359/365 |
| 3,811,749 | 5/1974 | Abel | 359/728 |
| 3,999,192 | 12/1976 | Hosoe et al. | 250/201.4 |
| 4,282,527 | 8/1981 | Winderman et al. | 343/725 |
| 4,469,414 | 9/1984 | Shafer | 359/731 |
| 4,629,295 | 12/1986 | Vogel | 359/364 |
| 4,836,666 | 6/1989 | Meinel et al. | 359/859 |
| 5,004,331 | 4/1991 | Haseltine et al. | 359/364 |

Primary Examiner—Bruce Y. Arnold
Assistant Examiner—James Phan
Attorney, Agent, or Firm—Rogers & Killeen

[57] ABSTRACT

An optical system for a night vision video camera having a pair of mirrors with an optical prescription providing f/2.8 speed and 50 line pairs per line millimeter resolution to an image intensifier located between the two mirrors on the common optic axis of the mirrors. The mirror first receiving the image to be viewed is an f/4 parabolic mirror and the second mirror is an f/10 spherical mirror with an external diameter of about forty percent of the diameter of the parabolic mirror (i.e., the obsuration ratio is about 0.40). The second mirror receives the reflected image of the object viewed by the night vision video camera from the first mirror and reflects the image to the image intensifier. The image may be viewed at a external view finder and can also be recorded.

13 Claims, 3 Drawing Sheets

OPTICAL SYSTEM FOR A NIGHT VISION VIDEO CAMERA

BACKGROUND OF THE INVENTION

The present is directed to night vision scopes and more particularly to an improved optical system for night vision video cameras in which a pair of mirrors provide a high speed and high resolution image to an image intensifier located between the mirrors, without the need for corrective lenses. The system is scalable to a diverse range of sizes and is suitable for rugged duty, such as police and military surveillance work.

Various types of night vision scopes are known. Typically, the image viewed by the night vision scope is reflected and/or refracted to an image intensifier that enhances the received image. The image intensifier permits the image to be viewed in low light level conditions, such as those encountered at night. The optical system of the night vision scope must have sufficient light gathering power (i.e., a low f-number with few optical aberrations) so that the image intensifier can provide a viewable image. Further, the optical system should provide an image resolution that is at least as good as, and preferably better than, the image resolution of the image intensifier. Image intensifiers suitable for night vision video cameras typically have a resolution of about 28-40 line pairs per millimeter.

The need to provide a high speed and suitably resolved image to the image intensifier has driven the development of night vision scopes to more complex optical systems. However, such complex systems require the use of aberration-introducing lenses. In an effort to do away with such lenses, other systems limit the number of reflections to one. These efforts tend to reduce the range capability of night vision video cameras. See, for example, the limited range system in U.S. Pat. No. 4,629,295 to Vogel.

Other optical systems that provide a pair of mirrors to reflect an image to a image viewing device do not have the speed and/or resolution required for night vision video cameras. See, for example, U.S. Pat. No. 2,817,270 to Mandler in which a telescope objective system provides a speed of only f/9, too slow for use with the night vision video camera. This is also true for the device in U.S. Pat. No. 4,282,527 to Winderman, et. al.

Accordingly, it is an object of the present invention to provide a novel optical system for a night vision video camera that obviates the problems of the prior art.

It is a further object of the present invention to provide a novel optical system for a night vision video camera that has an optical prescription that provides a high speed image with appropriate resolution to an image intensifier.

It is yet a further object of the present invention to provide a novel optical system for a night vision video camera that provides a high speed optical system in a novel, easy to manufacture structure suitable for rugged duty.

It is another object of the present invention to provide a novel night vision video camera having a lensless optical system that provides a high speed, suitably resolved image to a video camera.

These and many other objects and advantages of the present invention will be readily apparent to one skilled in the art to which the invention pertains from a perusal of the claims, the appended drawings, and the following detailed description of preferred embodiments.

BRIEF DESCRIPTION OF THE DRAWINGS

FIGS. 3A-B are defocused a first direction and FIGS. 3D-E are defocused the opposite direction. FIG. 3C is in focus.

DESCRIPTION OF PREFERRED EMBODIMENTS

Figure 1:
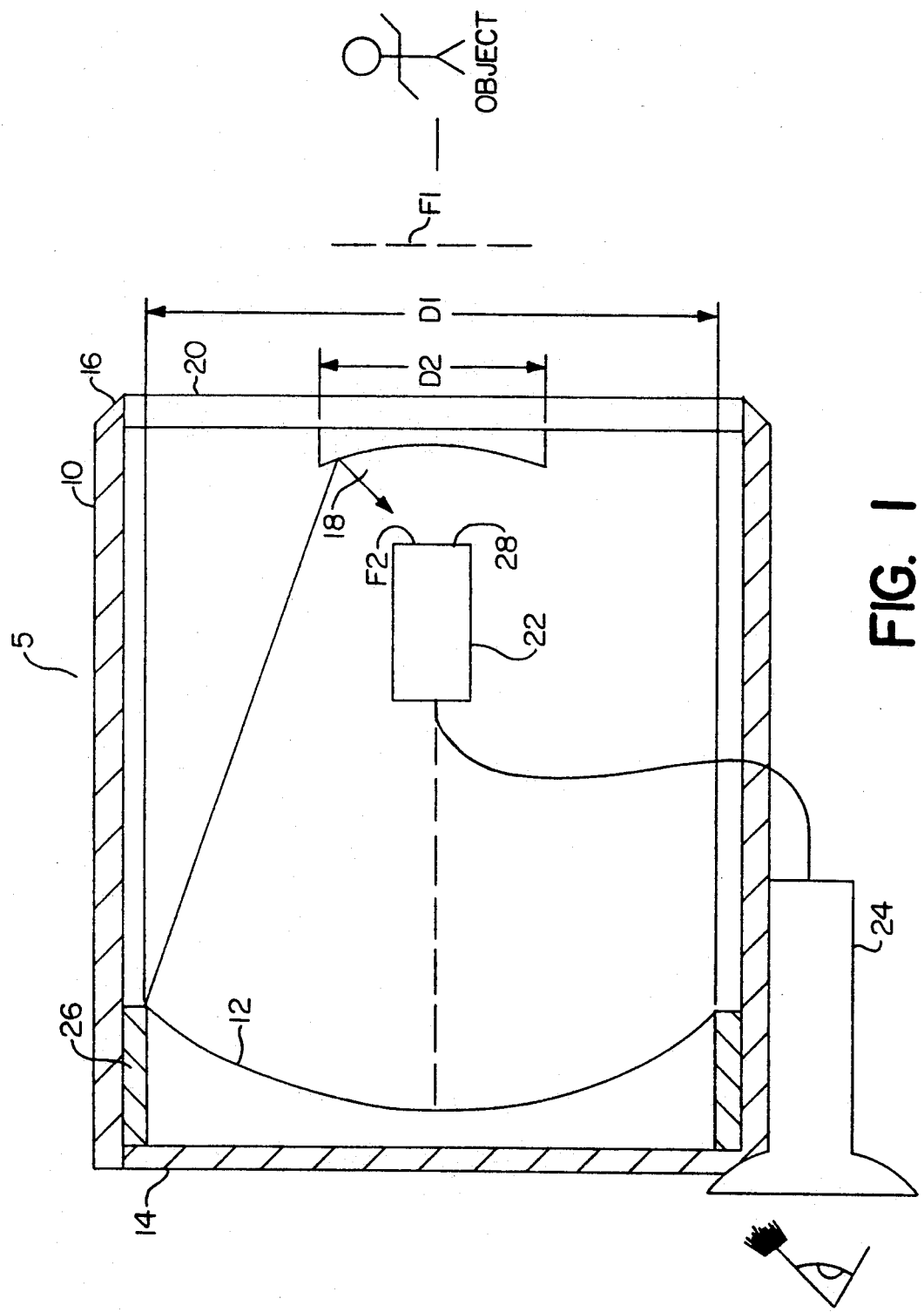
FIG. 1 is a pictorial depiction of a longitudinal cross section of the present invention.

With reference now to FIG. 1, the present invention may include a night vision video camera 5 with a generally cylindrical barrel 10 having a longitudinal axes coincident with the optic axes of the night vision video camera 5, a generally circular, concave parabolic mirror 12 adjacent a first end 14 of the barrel 10, a generally circular, concave spherical mirror 18 adjacent the other end 16 of the barrel 10, a flat optically transparently plate 20 adjacent the end 16 for protecting the interior of the barrel 10, an image intensifier 22 between the mirrors 12 and 18 on the longitudinal axis of the barrel 10, and a viewfinder 24 external to the barrel 10 connected to image intensifier 22 for viewing the image produced thereby.

The barrel 10 may comprise a single piece of suitable tubular material, such as aluminum or steel, with one closed end 14. The other end 16 of the tube is open so that the mirrors inside the barrel 10 may receive images of the object. The plate may seal the interior of the barrel 10, which may be nitrogen purged for protection from moisture.

The parabolic mirror 12 may have a radius of curvature of about 1219.2 millimeters and a focal plane F1 located beyond the end 16 of the barrel. The mirror 12 may have an optic axis coincident with the longitudinal axis of the barrel 10 and desirably has a speed of f/4. The mirror 12 faces the objects to be viewed by the night vision video camera and reflects the images of those object toward the mirror 18. In a preferred embodiment, the focal plane F1 of six inch diameter f/4 mirror 18 is located 24 inches from a the mirror.

Figure 2:
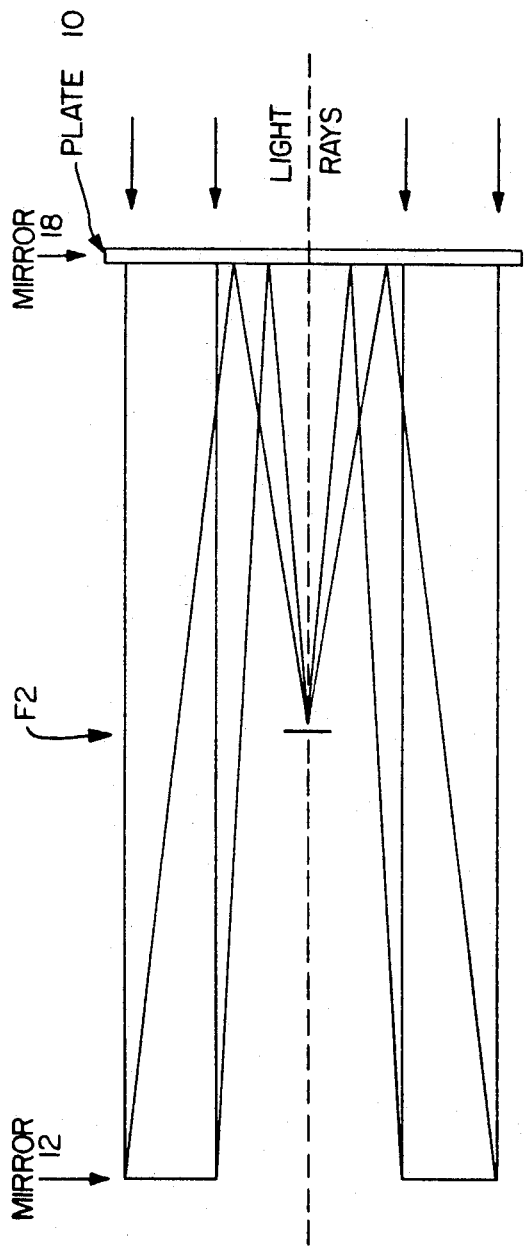
FIG. 2 is a ray trace showing the approximate reflections of received light in an embodiment of the present invention.

The spherical mirror 18 may have a radius of about 1270 millimeters and a new focal plane F2 (the focal plane for light reflected from both mirrors) located between the mirrors 12 and 18. The mirror 18 may have an optic axis coincident with the longitudinal axis of the barrel 10 and desirably has a speed of f/10. The mirrors 12 and 18 provide a combined speed of f/2.8 and a resolution of about 50 line pairs per millimeter. In a preferred embodiment the new focal plane F2 of the video camera with a six inch f/4 mirror 12 and a 2.5 inch f/10 mirror 18 spaced fourteen inches apart is about three inches from mirror 18. A ray tracing of the this arrangement of mirrors may be seen in FIG. 2.

Figures 3A, 3B, 3C:
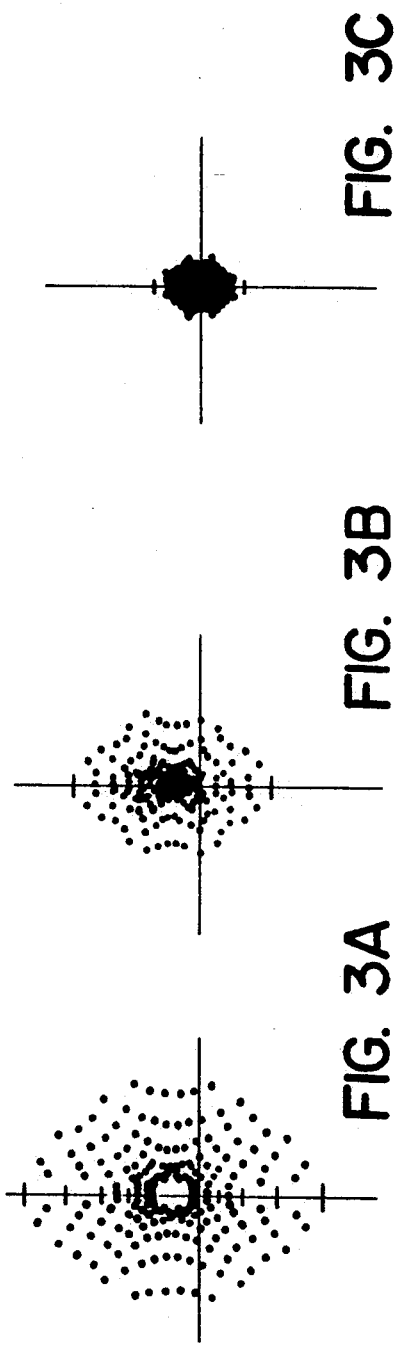
FIGS. 3A-E are focus spot diagrams of a 25 micron spot in the focal plane.
Figure 3D:
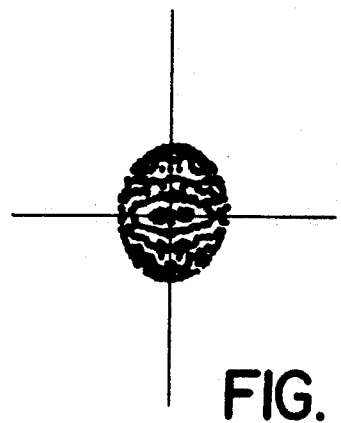
Figure 3E:
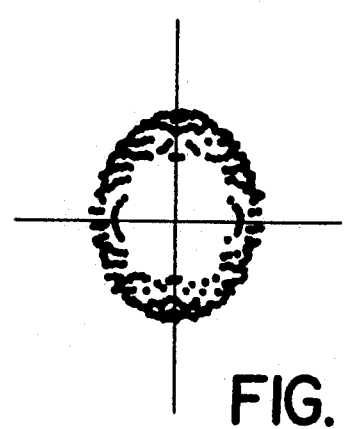

The mirror 18 faces the mirror 12 to receive images reflected therefrom and to be able to reflect the received images to the image intensifier 22 located between the mirrors 12 and 18. The mirror 18 preferably has a diameter that is about forty percent of the corresponding diameter of the mirror 12, as measured perpendicular to the longitudinal axes of the barrel 10 (i.e., an obsuration ratio of about 0.4). While the mirror 18 may be larger or smaller than this size, larger sizes reduce the light gathering power of the night vision video camera and smaller sizes reduce the resolution of the image provided to the image intensifier 22 by introducing aberrations into the image. The aberrations in the present invention are minimal, as may be plane F2 in FIGS. 3A–E. As illustrated therein, there are no seen in the focus spot diagrams of a 25 micron spot in the focal significant pattern formations on either side (FIGS. 3A–B and 3D–E) of focus (FIG. 3C). The lack of pattern formation indicates the lack of aberrations in the system.

Both of the mirrors 12 and 18 may have reflective surfaces of enhanced aluminum, that is, silver with an aluminum overcoat, so as to be about 98% reflective. The mirror 12 may be mounted in the barrel 10 with suitable fittings 26 or by other methods known in the art so that deformations due to mechanical and/or thermal disturbances may be reduced. For example, the mirror 12 may be center hung with a screw (not shown) through the center of the mirror. Since the center of the mirror is in the shadow of the mirror 18, the center hang method causes no loss of optical performance. The mirror 12 may also be hung with clips (not shown) or by embedding the mirror in a machined cell in the end of the barrel 10. The alignment of the mirrors 12 and 18 in the barrel may be achieved by machining the ends 14 and 16 of the barrel where the mirror 12 and the plate 20 are to be affixed. The mirror 18 may be affixed (e.g., glued) to the plate 20.

The flat, optically transparent plate 20 may be any suitable protective structure, such as B270 glass having a thickness of about 5.7 millimeters, BK-7 glass or similar crown-glass.

The image intensifier 22 may be any intensifier suitable for night vision use in a video camera system. The image receiving portion 28 of the image intensifier 22 is desirably located at focal plane F2. The f/2.8 combined speed of the optical system allows the video camera to operate in low light level conditions. The intensifier 22 may be carried in the barrel by a spider (not shown) or by other suitable means and should have a size so that it does not interfere with the image being reflected from the mirror 12 to the mirror 18. A suitable second or third generation micro-channel plate unit image intensifier is cylindrical with an external diameter of eighteen to twenty five millimeters and has an automatic gain setting responsive to the illumination level of the received light.

The image intensifier 22 may also be carried in the barrel so that it may provide a variable focal length. That is, the image intensifier may be carried so that it can move along the optic axis of the mirror 18.

Figure 4:
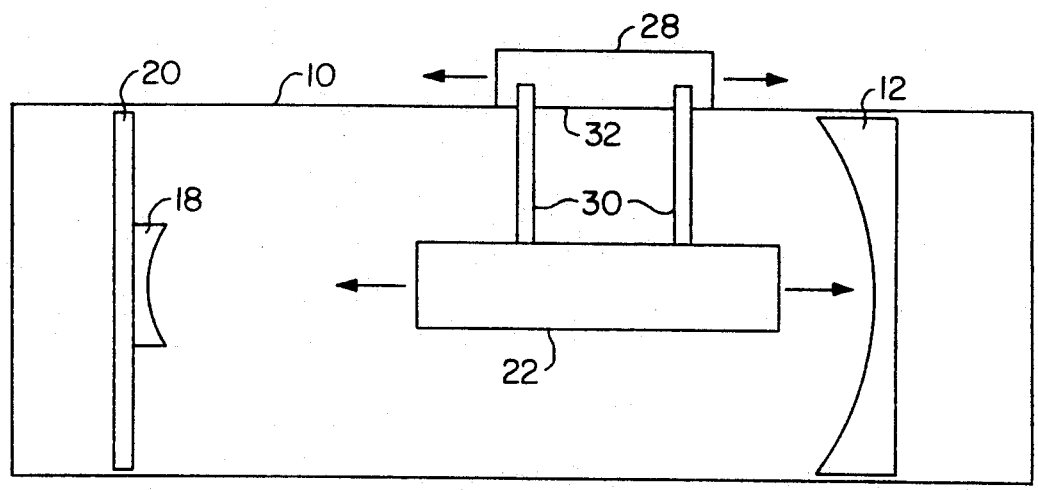
FIG. 4 is a pictorial depiction of an embodiment of the present invention illustrating an assembly for focusing the image intensifier.

With reference now to FIG. 4, the image intensifier 22 may be focused by moving the image intensifier 22 along the optic axis of the video camera 5. To this end, the image intensifier 22 may be suspended from a mount 28 movably carried on the exterior of the tube 10 and be adapted to move as indicated by the arrows in the figure. The mount 28 may be connected to intensifier 22 with one or more struts 30 that move in a longitudinal slot 32 in the tube 10. The slot 32 may be provided with suitable means as are known in the art to protect the interior of the tube 10 from exposure to air and/or light.

Figure 5:
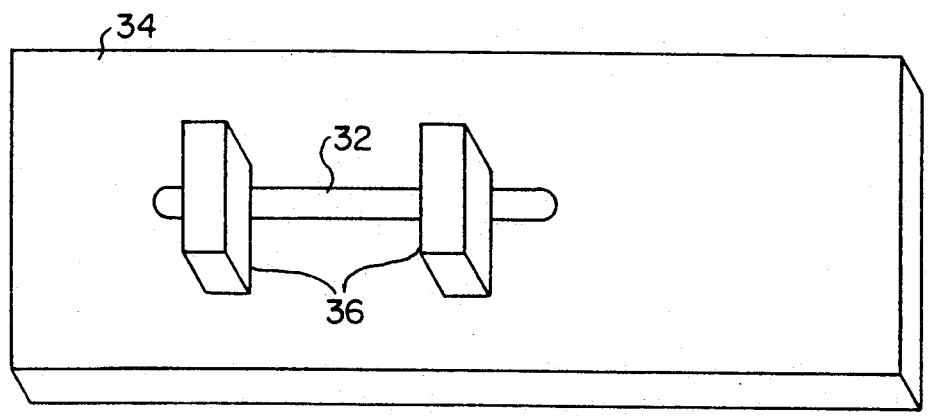
FIG. 5 is a pictorial depiction of a focusing mount for the focusing assembly illustrated in FIG. 4.

With reference now to FIG. 5, the mount 28 may include a base 34 having the slot 32 therein. The struts 30 may be connected to one or more blocks 36 that may be moved longitudinally to adjust the focus.

The diameters of the mirrors and the separation therebetween may be selected to meet the range requirements of the night vision video camera. It has been found that features of adult subjects (e.g., facial features, shirt, glasses) may be observed out to about 1,000 feet with a device in which mirror 12 has a diameter of about six inches, mirror 18 has a diameter of about two and one-half inches, and when the intensifier is an 18 mm intensified CCD device and the spacing between the mirrors is approximately fourteen inches. The focal length of this optical system is about 427 millimeters. Increased range may be achieved with the same optical prescription by increasing the diameters of the mirrors and the distance therebetween. For example, a range (recognition of features on an adult subject) of about 2000 feet is achievable with a twelve inch diameter mirror 12 and a five inch diameter mirror 18 spaced about twenty eight inches apart.

Other mirror combinations may be used in the present invention to provide other speeds as dictated by operational needs. A faster speed, f/2 for example, provides better light gathering capability, but produces a smaller image with lower resolution. This may be preferably where detection is more important than identification.

The viewfinder 24 may be any suitable device, such as a cam-recorder one inch CRT. The viewfinder 24 may be mounted on the exterior of the barrel 10 at an appropriate location. Instead of, or in addition to the viewfinder, a still camera, television monitor and/or suitable recording equipment may be connected to the image intensifier.

The structure of the present invention is relatively easy to manufacture in that it has few parts and, due to the simple optics (no lenses), reduced manufacturing tolerances. Corrective lenses may be used, albeit with increased complexity and manufacturing cost. It is also simple to clean —it has only one optical surface, and is optically color-error free so that it may be used for other purposes, such a radiometric measurements.

While preferred embodiments of the present invention have been described, it is to be understood that the embodiments described herein are illustrative only and that the scope of the invention is to be defined solely by the appended claims, when accorded a full range of equivalence, many variations and modifications naturally occurring to those skilled in the art from a perusal hereof.

We claim:

1. An improved optical system for a night vision video camera having an image intensifier, the improvement comprising:
 a concave, generally circular, parabolic mirror for reflecting the image of an object to be viewed by the night vision video camera;
 a concave, generally circular, spherical mirror for receiving the image from said parabolic mirror and reflecting the received image to the image intensifier, said spherical mirror having a diameter about forty percent of a corresponding diameter of said parabolic mirror; and said parabolic mirror and said spherical mirror having a combined speed of at least f/2.8 so that the image intensifier is able to gather enough light to operate in low light level conditions.

2. The optical system as defined in claim 1 wherein said parabolic mirror has a speed of f/4 and said secondary mirror has a speed of f/10.

3. The optical system as defined in claim 1 wherein said parabolic mirror has a diameter of about six inches and said spherical mirror has a diameter of about two and one-half inches.

4. The optical system as defined in claim 1 wherein the image intensifier is between said parabolic mirror and said spherical mirror on an optic axis of said spherical mirror.

5. The optical system of claim 1 wherein said parabolic mirror and said spherical mirror are at opposite ends of a generally cylindrical tube having a longitudinal axis coincident with an optic axis of said spherical mirror.

6. The optical system of claim 1 wherein said parabolic mirror and said spherical mirror are at opposite ends of a generally cylindrical tube having a longitudinal axis coincident with an optic axis of said spherical mirror.

7. The optical system of claim 6 wherein said parabolic mirror has a focal plane beyond a distal end of said tube and said spherical mirror has a focal plane between said opposite ends.

8. An improved optical system for a night vision video camera having an image intensifier, the improvement comprising:
   an f/4 concave parabolic mirror for reflecting the image of an object to be viewed by the night vision video camera;
   an f/10 concave spherical mirror for receiving the image from sad parabolic mirror and reflecting the received image to the image intensifier, said parabolic mirror and said spherical mirror having coincident optic axes; and 9. The optical system as defined in claim 8 wherein said spherical mirror has a diameter of about forty percent of a corresponding diameter of said parabolic mirror.

10. The optical system as defined in claim 8 wherein said parabolic mirror and said spherical mirror are at opposite ends of a generally cylindrical tube having a longitudinal axis coincident with said optic axes.

11. The optical system as defined in claim 10 wherein said parabolic mirror has a focal plane beyond a distal end of said tube and said spherical mirror has a focal plane between said opposite ends.

12. The optical system as defined in claim 8 wherein said image intensifier is carried so that it may be moved along said optic axis for focusing said optical system.

13. The optical system of claim 8 wherein said parabolic mirror has a diameter of about six inches and said spherical mirror has a diameter of about two and one-half inches.

* * * * *